(12) United States Patent
Chaudhry et al.

(10) Patent No.: US 7,836,290 B2
(45) Date of Patent: Nov. 16, 2010

(54) RETURN ADDRESS STACK RECOVERY IN A SPECULATIVE EXECUTION COMPUTING APPARATUS

(75) Inventors: Shailender Chaudhry, San Francisco, CA (US); Quinn A. Jacobson, Sunnyvale, CA (US); Paul Caprioli, Mountain View, CA (US); Marc Tremblay, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 11/363,625

(22) Filed: Feb. 28, 2006

(65) Prior Publication Data

US 2007/0106888 A1 May 10, 2007

Related U.S. Application Data

(63) Continuation of application No. 11/352,147, filed on Feb. 10, 2006.

(60) Provisional application No. 60/735,338, filed on Nov. 9, 2005, provisional application No. 60/741,210, filed on Dec. 1, 2005.

(51) Int. Cl.
*G06F 9/44* (2006.01)

(52) U.S. Cl. ........................ 712/242

(58) Field of Classification Search ........ 712/242, 712/239, 243
See application file for complete search history.

(56) References Cited

U.S. PATENT DOCUMENTS

| | | | |
|---|---|---|---|
| 5,561,775 A | 10/1996 | Kurosawa et al. | |
| 5,935,238 A | 8/1999 | Talcott et al. | |
| 5,949,996 A | 9/1999 | Atsushi | |
| 5,964,868 A | 10/1999 | Gochman et al. | 712/234 |
| 5,964,869 A | 10/1999 | Talcott et al. | |
| 6,035,118 A | 3/2000 | Lauterbach et al. | |
| 6,101,326 A | 8/2000 | Mattson, Jr. | 395/709 |
| 6,314,514 B1 | 11/2001 | McDonald | |
| 6,374,350 B1 * | 4/2002 | D'Sa et al. | 712/239 |
| 6,625,719 B2 | 9/2003 | Leach et al. | |
| 6,898,699 B2 * | 5/2005 | Jourdan et al. | 712/243 |
| 7,130,972 B2 | 10/2006 | Yamamoto et al. | 711/156 |

(Continued)

OTHER PUBLICATIONS

Hennessy, John L. and Patterson, David A., *Computer Architecture A Quantitative Approach*, Third Edition, 2003, pp. 224-240, Morgan Kaufman Publishers, USA.

(Continued)

*Primary Examiner*—Jacob Petranek
(74) *Attorney, Agent, or Firm*—Gunnison, McKay & Hodgson, L.L.P.; Forrest Gunnison

(57) ABSTRACT

A technique recovers return address stack (RAS) content and restores alignment of a RAS top-of-stack (TOS) pointer for occurrences of mispredictions due to speculative operation, out-of-order instruction processing, and exception handling. In at least one embodiment of the invention, an apparatus includes a speculative execution processor pipeline, a first structure for maintaining return addresses relative to instruction flow at a first stage of the pipeline, at least a second structure for maintaining return addresses relative to instruction flow at a second stage of the pipeline. The second stage of the pipeline is deeper in the pipeline than the first stage. The apparatus includes circuitry operable to reproduce at least return addresses from the second structure to the first structure.

11 Claims, 11 Drawing Sheets

U.S. PATENT DOCUMENTS

2003/0131220 A1*  7/2003  Hummel et al. ............. 712/242
2004/0128448 A1*  7/2004  Stark et al. ................. 711/137
2007/0061555 A1*  3/2007  St. Clair et al. ............ 712/242

OTHER PUBLICATIONS

Desmet, Veerle et al., "Correct Alignment of a Return-Address-Stack after Call and Return Mispredictions", *Proceedings of the 4th Workshop on Duplicating, Deconstructing, and Debunking, held in Conjunction with the 32nd International Symposium on Computer Architecture*, 2005, pp. 25-33.

Return-Address Stack, http://www.usenix.org/events/sec01/full_papers/frantzen/frantzen_html/node11.html, 2 pages.

Skadron et al., "Improving Prediction for Procedure Returns with Return-Address-Stack Repair Mechanisms", *Proceedings of the 31st Annual ACM/IEEE International Symposium on Microarchitecture*, IEEE Comp. Soc., Los Almitos, CA, Nov. 30, 1998, pp. 259-271. (XP000871947).

* cited by examiner

RETURN ADDRESS STACK RECOVERY IN A SPECULATIVE EXECUTION COMPUTING APPARATUS

CROSS-REFERENCE TO RELATED APPLICATION(S)

This application claims benefit under 35 U.S.C. §119 of provisional application No. 60/735,338, filed Nov. 9, 2005, naming Shailender Chaudhry, Quinn A. Jacobson, Paul Caprioli, and Marc Tremblay as inventors, which application is incorporated by reference herein. This application also claims benefit under 35 U.S.C. §119 of provisional application No. 60/741,210, filed Dec. 1, 2005, naming Paul Caprioli, Sherman H. Yip, and Shailender Chaudhry as inventors, which application is incorporated by reference herein.

This application is a continuation of commonly assigned U.S. patent application Ser. No. 11/352,147, entitled "Mechanism for Hardware Tracking of Return Address after Tail Call Elimination of Return-Type Instruction," filed on Feb. 10, 2006 naming Paul Caprioli, Sherman H. Yip, and Shailender Chaudhry as inventors.

BACKGROUND

1. Field of the Invention

The present invention relates to the field of computers. More specifically, the present invention relates to computer architecture.

2. Description of the Related Art

A pipelined superscalar processor may fetch and execute instructions speculatively until an actual target address for change of control instructions (i.e., those instructions that modify the program counter from a predetermined increment) can be determined. For example, speculative execution of instructions occurs while waiting for a branch target address to be resolved. The actual target of the branch may not be determined until many instruction cycles after making the branch prediction and speculative fetch of instructions. Meanwhile, speculatively fetched and/or executed instructions and/or TRAP instructions may include changes in program flow.

A pipelined superscalar processor may include a return address stack (RAS), i.e., a stack of return addresses of function calls. The RAS is accessed using a stack pointer containing the address of the top of the stack. Call instructions push addresses onto the RAS and the RAS pointer is updated accordingly. Return instructions pop addresses from the top of the RAS and the RAS pointer is updated accordingly. A balanced sequence of pushes and pops will ensure correct return addresses. Updates to the RAS pointer and/or the RAS inconsistent with actual program execution may result in misalignment of the RAS pointer to the RAS (i.e., the RAS pointer incorrectly points to a particular entry of the RAS) and/or corruption of RAS content. Such corruption of the RAS content and/or the RAS pointer may occur as a result of mispredicted speculative operations. In addition to mispredicted speculative operations, the RAS pointer and/or RAS content may be corrupted by changes in program flow resulting from program exception handling. Such corruption to the RAS pointer or RAS content can impact performance significantly.

SUMMARY

A technique recovers return address stack (RAS) content and restores alignment of a RAS top-of-stack (TOS) pointer for occurrences of mispredictions due to speculative operation, out-of-order instruction processing, and exception handling. In at least one embodiment of the invention, an apparatus includes a speculative execution processor pipeline, a first structure for maintaining return addresses relative to instruction flow at a first stage of the pipeline, at least a second structure for maintaining return addresses relative to instruction flow at a second stage of the pipeline. The second stage of the pipeline is deeper in the pipeline than the first stage. The apparatus includes circuitry operable to reproduce at least return addresses from the second structure to the first structure.

In at least one embodiment of the invention, an apparatus includes a speculative execution processor pipeline and a first structure for maintaining return addresses associated with instructions at a first stage of the pipeline. The first structure includes a first pointer for referencing return addresses in the first structure consistent with instructions at the first stage of the pipeline. The apparatus includes at least a second pointer for referencing return addresses consistent with instructions at a second stage of the pipeline and at least a third pointer for referencing return addresses consistent with instructions at a third stage of the pipeline. The apparatus includes circuitry operable to reproduce at least contents of at least one of the second and third pointers to the first pointer upon occurrence of at least a first event having a particular type.

In at least one embodiment of the invention, a method of operating a processor includes maintaining a respective return address structure corresponding to respective instruction flow at each of at least two stages within an instruction pipeline of the processor. The method includes restoring return address information from one return address structure to another return address structure upon the occurrence of an event having a particular type.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
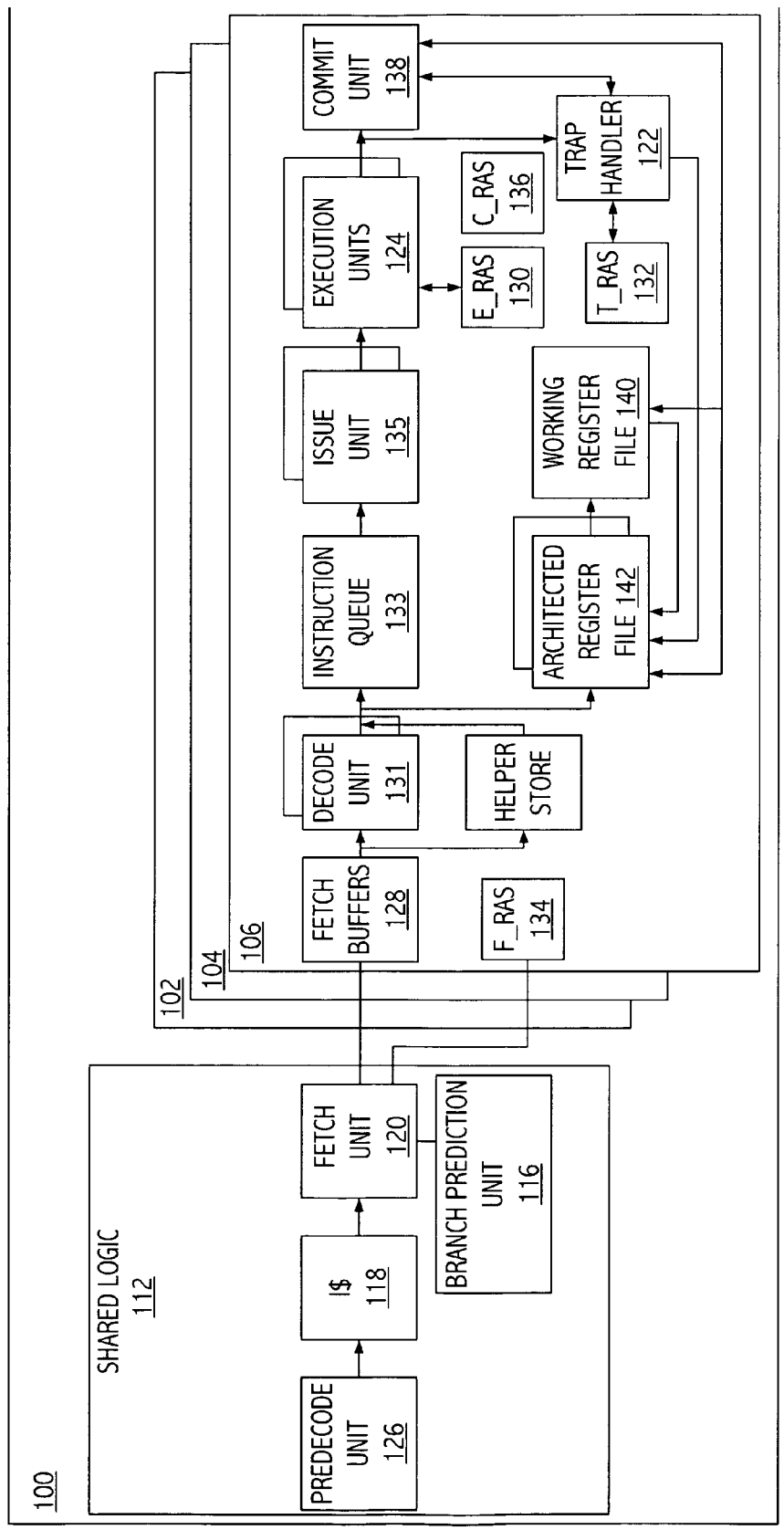
FIG. 1 illustrates a block diagram of a superscalar processor pipeline consistent with at least one embodiment of the invention.

Referring to FIG. 1, an exemplary high performance microprocessor architecture (e.g., processor 100) includes multiple pipelines (e.g., the pipelines including shared logic 112 and respective ones of pipeline portions 102, 104, 106) to obtain high instruction throughput for high performance operation. Resources may be dedicated to a particular pipeline (e.g., resources included in pipeline portion 106) or shared by multiple pipelines (e.g., resources included in shared logic 112). Shared logic 112 may include instruction fetch unit 120, which fetches instructions from an instruction store (e.g., instruction cache 118) and receives a group of instructions. For example, fetch unit 120 requests a line from the instruction cache 118, and receives a group of instructions that is stored at the requested line. Tasks performed by exemplary fetch unit 120 may be performed by logic distributed across multiple pipeline portions 102, 104, and 106 or may be performed by logic in shared logic 112, or combinations thereof. For each received instruction group, fetch unit 120 accesses branch prediction unit 116.

Branch prediction unit 116 may implement a static, semi-static, or dynamic branch prediction strategy. Branch prediction unit 116 provides information for multiple instructions concurrently (e.g., at approximately the same time, such as within the same cycle, half cycle, etc.) to the fetch unit. An exemplary branch prediction unit is described in U.S. patent application Ser. No. 11/068,626 entitled "Multiple Branch Predictions", filed Feb. 28, 2005, naming Shailender Chaudhry and Paul Caprioli as inventors, which application is incorporated herein by reference. Although fetch unit 120 fetches instructions for multiple pipelines, fetch unit 120 fetches instructions for one instruction strand at a time and updates one set of fetch buffers (e.g., fetch buffers 128) and a return address stack (e.g., return address stack F_RAS 134) in the pipeline (e.g., the pipeline including pipeline portion 106) corresponding to the particular instruction strand.

In a particular pipeline of the exemplary microprocessor, the fetched instructions are decoded by decode unit(s) 131 and queued in instruction queue 133. The decoded instructions are then issued to execution unit(s) 124 by issue unit(s) 135. Branch prediction information may be supplied to one or more of the fetch unit 120, decode unit(s) 131, issue unit(s) 135, and the execution unit(s) 124. Pipeline portion 106 includes trap handler 122 which processes exception events. Exceptions and exception events, as used herein, refer to internal interrupts (e.g., trap, exceptions), external interrupts, software interrupts, or other non-branch events that may change the normal flow of instruction execution. Results of instruction execution are committed (e.g., by storing appropriate entries of working register file 140 in architected register file 142) by commit unit 138.

Exemplary processor 100 may execute instructions speculatively, i.e., operations execute as soon as their operands are available, also known as conditional processing. For example, processor 100 may execute instructions speculatively by executing instructions during a delay introduced by a prior instruction (e.g., instructions subsequent to a branch instruction, fetch from memory, or other action that may introduce delay slots in a pipelined processor, are executed during the delay introduced by such instruction). If results of the instructions that were speculatively executed turn out to be unneeded, the results are discarded. Upon completion of the delay introduced by the delay event, execution is no longer speculative and non-speculative execution resumes.

Instructions for execution may be chosen by dynamic branch prediction of branch prediction unit 116. Such speculation allows the execution of instructions before control dependencies are resolved (with the ability to undo the effects of an incorrectly speculated sequence). Instructions execute and pass results to other instructions without allowing the instruction to perform any updates that cannot be undone until the instruction is no longer speculative. When processor 100 determines that a speculatively executed instruction is no longer speculative, the register file or memory is updated by commit unit 138. Instructions may execute out of order, but are committed in order. Typically, irrevocable actions, e.g., updating a state of pipeline portion 106 or handling certain exceptions, are prevented until a commit stage of the pipeline.

Exemplary pipeline portion 106 updates a return address stack (e.g., F_RAS 134) upon fetching an appropriate instruction and also maintains at least a time-delayed version of the return address stack pointer, which is updated during an execution stage. Upon detection of a misprediction in the speculative execution at the execution units 124, pipeline portion 106 clears the pipeline and undoes any effects of instructions fetched following the mispredicted instruction. Pipeline portion 106 updates the stack pointer associated with F_RAS 134, e.g., by copying the time-delayed stack pointer to the pointer associated with F_RAS 134. Assuming that instructions speculatively fetched after the mispredicted instruction were not destructive to the F_RAS content, F_RAS will be returned to a state prior to execution of the mispredicted instruction and program flow will be resumed.

However, in some situations, thousands of instructions may be fetched prior to resolving, e.g., a branch target address. Instructions fetched subsequent to the branch instruction may include instruction sequences that are destructive to the content of F_RAS 134 (e.g., an instruction that invokes a POP operation on the F_RAS followed by an instruction invoking a PUSH operation on the F_RAS). In such cases, maintaining a copy of the stack pointer associated with F_RAS 134 is insufficient to maintain the integrity. Processor 100 may include another return address stack, e.g., E_RAS 130 and an associated stack pointer to maintain a time-delayed version of the return address stack that is updated at the execute stage of the pipeline. Upon detection of a misprediction in the speculative execution at the execution units 124, processor 100 clears the pipeline and undoes effects of instructions fetched following the mispredicted instruction. Processor 100 may update the stack pointer associated with F_RAS 134 by copying the stack pointer associated with E_RAS 130 to the pointer associated with F_RAS 134. In addition, processor 100 updates F_RAS 134 with the contents of E_RAS 130, e.g., by flash copying the contents of E_RAS 130 to F_RAS 134.

Flash copying is a technique that includes moving substantial amounts of data at substantially the same time. For example, substantially all of the RAS entries may be copied from E_RAS 130 to F_RAS 134 during the same clock cycle. Although F_RAS 134 and E_RAS 130 are architecturally associated with different stages of the pipeline (e.g., the fetch stage and the execute stage, respectively), F_RAS 134 and E_RAS 130 may be located in physical proximity (e.g., side-by-side) to facilitate transfer of substantially all of the return addresses stored in E_RAS 130 to F_RAS 134 within one clock cycle. In at least one embodiment of the invention, the entries of E_RAS 130 are copied to F_RAS 134 over multiple clock cycles. Since F_RAS 134 is a stack and is accessed from the top of the stack (i.e., it is accessed by the pointer associated with F_RAS 134), copying begins with the location indicated by the pointer. By continuing the copying by proceeding from the location indicated by the pointer through the remaining entries of the stack, the entire RAS may be copied in a sufficiently timely manner over multiple clock cycles.

In general, an exception event invokes an unexpected function, subroutine, or procedure call. Trap handler 122 may cause pipeline 106 to save certain processor state information (e.g., program counter(s), condition code register(s), return address stack pointer, and other state information) in a memory (e.g., a hardware register stack) and cause the pipeline(s) to execute the unexpected function, subroutine, or procedure. For example, processor 100 may implement vectored trap handling. Upon an exception event, the trap handler will initiate execution of trap handling code associated with a particular trap vector. Exception handling may be precise, allowing return to the interrupted program, i.e., 1) all instructions preceding the instruction indicated by the saved program counter have been executed and have modified the processor state correctly; 2) all instructions following the instruction indicated by the saved program counter are unexecuted and have not modified the processor state; and 3) if the interrupt is caused by an exception condition raised by a program instruction, the saved program counter points to the interrupted instruction. In exemplary processor 100, the saved program counter corresponds to the instruction in commit unit 138, an instruction that was to be committed had the exception not occurred. However, processor 100 may implement other known interrupt handling strategies (e.g., the saved program counter may correspond to an instruction in issue unit(s) 135, prior to the execution units 124).

As pipeline depths increase, the number of in-flight instructions increases and conventional techniques for handling exceptions may no longer be effective. For example, in a typical processor, upon returning to the normal program execution following an exception event, the RAS pointer is restored from memory. However, some sequences of instructions may destructively update the contents of the RAS. For example, since F_RAS 134 is updated during the fetch stage, if an instruction fetched into fetch buffers 128 performs a POP operation (e.g., a RETURN instruction) and a subsequently fetched instruction, fetched prior to an exception event and fetched into the fetch buffers 128, performs a PUSH operation (e.g., a jump to subroutine instruction) and an instruction concurrently in the execution units 124 triggers a trap event, upon returning from the exception event, the contents of F_RAS 134 are corrupted with respect to the POP function, which is restarted upon return from an exception handling routine. Accordingly, saving only the state of the RAS pointer is insufficient to effectuate a complete restoration of the correct RAS state. Similarly, typical interrupt handling of the RAS, i.e., saving the entire RAS in a hardware stack upon an exception event, is insufficient to effectuate a complete restoration of the correct RAS state. Accordingly, T_RAS 132 of processor 100 may include a time delayed RAS in addition to a time delayed RAS stack pointer.

In at least one embodiment of the invention, T_RAS 132 includes a delayed version of the stack pointer associated with F_RAS 134. T_RAS 132 is updated at the trap stage of pipeline portion 106 for any return address stack affecting instruction that completes execution and is committed without the occurrence of an exception event. Upon detection of an exception event, pipeline portion 106 clears the pipeline and undoes effects of instructions fetched following an event causing the exception and effects of other instructions that have not yet been committed prior to the exception event. Upon restoring the state of pipeline portion 106 following the completion of the exception handling, pipeline portion 106 updates the stack pointer associated with at least F_RAS 134 by copying the time-delayed stack pointer from T_RAS 132 to the pointers associated with F_RAS 134 and E_RAS 130.

As the number of speculative instructions executed by processor 100 increases and exceeds the depth of the pipeline, maintaining F_RAS 134, E_RAS 130, and T_RAS 132 may not be enough to maintain the integrity of the return address stack. Checkpointing is a technique for supporting speculative execution by which processor 100 saves the state of a pipeline at a particular point in the corresponding thread (i.e., a separate process with its own instructions, data, and state information) or program. A flash copy operation may instantly copy all of the state information to corresponding checkpoint registers or memory locations (e.g., C)RAS 136 and an associated pointer). The checkpointing technique saves enough state information for the processor to be able to restart the corresponding thread at the checkpoint in the event of a misprediction. Upon such a misprediction, the checkpointed information is restored to associated state elements and the thread restarts execution from the checkpoint. Multiple checkpoints may be taken to reduce the number of instructions reexecuted upon a branch misprediction. For example, if multiple instructions in a portion of code are speculatively executed, a checkpoint may be associated with each of those instructions. If one of those instructions is mispredicted, the machine may return to the checkpoint associated with the mispredicted instruction instead of a checkpoint associated with another instruction.

In at least one embodiment of the invention, E_RAS 130 and T_RAS 132 are differential versions of F_RAS 134, i.e., these time delayed versions of F_RAS 134 contain only a number of entries corresponding to the distance in pipeline depth between the F_RAS 134 and respective ones of E_RAS 130 and T_RAS 132. Such a design choice trades off integrated circuit area with the amount of control logic. A full RAS implementation for E_RAS 130 and T_RAS 132 is larger than differential versions, however, additional control logic is included for restoring the F_RAS 134 from such differential versions.

Figure 2A:
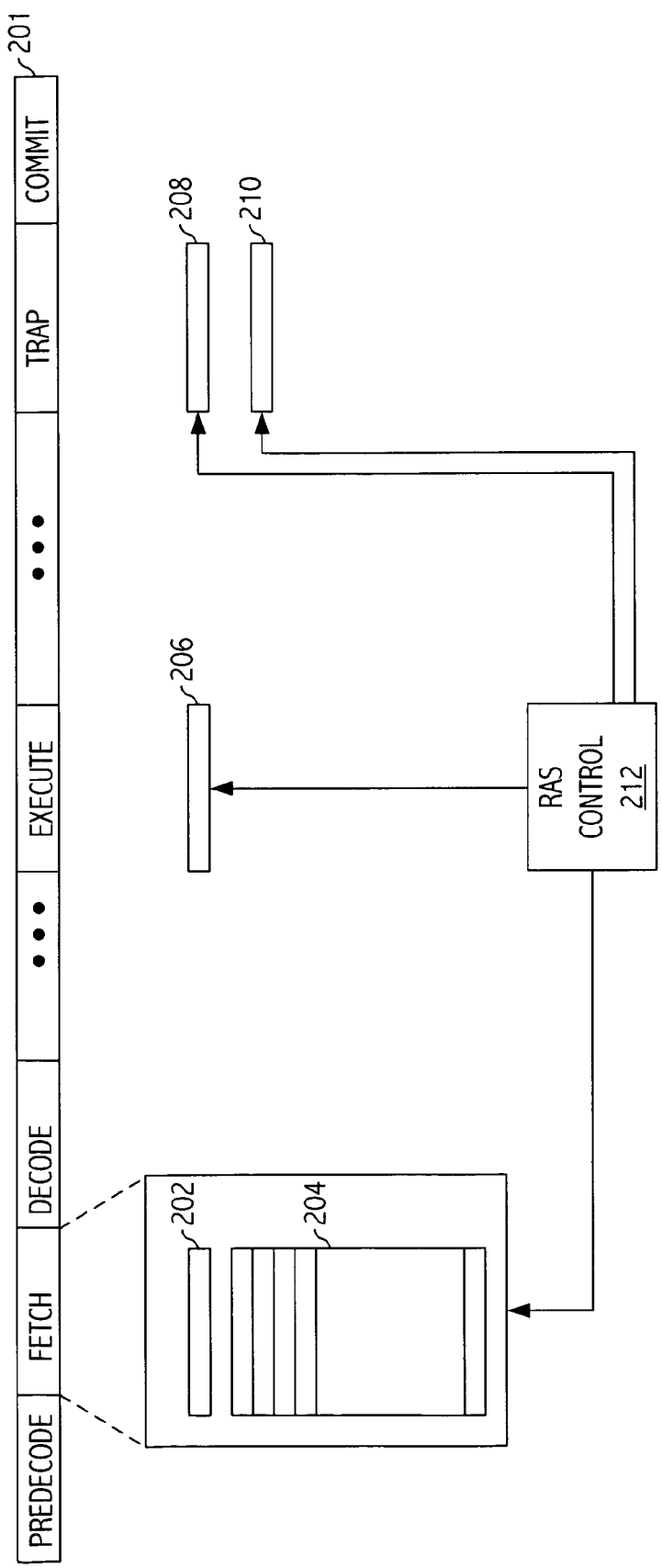
FIG. 2A illustrates a simplified processor pipeline and at least some associated hardware consistent with at least one embodiment of the invention.

Referring to FIG. 2A particular stages of a simplified version of a pipeline consistent with at least one embodiment of the invention are associated with corresponding return address stack structures, which are controlled by RAS control 212. In at least one embodiment of the invention, RAS control 212 is implemented with control circuitry that is distributed across multiple pipeline stages, e.g., circuitry included in fetch unit 120, execution units 124, trap handler 122, or other pipeline stages. RAS control 212 updates RAS pointer 202 upon detection of RAS-affecting instructions during the fetch stage of pipeline 201. RAS pointer 206 is updated during the execute stage and contains a time delayed version of RAS pointer 202. RAS control 212 restores the contents of RAS pointer 202 with the contents of RAS pointer 206 in the event that instructions fetched after a speculative instruction is resolved are being cleared from pipeline 201. RAS pointer 208 is updated during the trap stage for RAS-affecting instructions that have executed without an exception event. RAS control 212 restores the contents of RAS pointer 202 and RAS pointer 206 with the contents of RAS pointer 208 in the event of exception handling. RAS pointer 210 is a checkpointed version of RAS pointer 202. RAS control 212 restores the contents of RAS pointers 202, 206, and 208 with the contents of RAS pointer 210 in the event that the program is restored to a checkpoint.

Figure 2B:
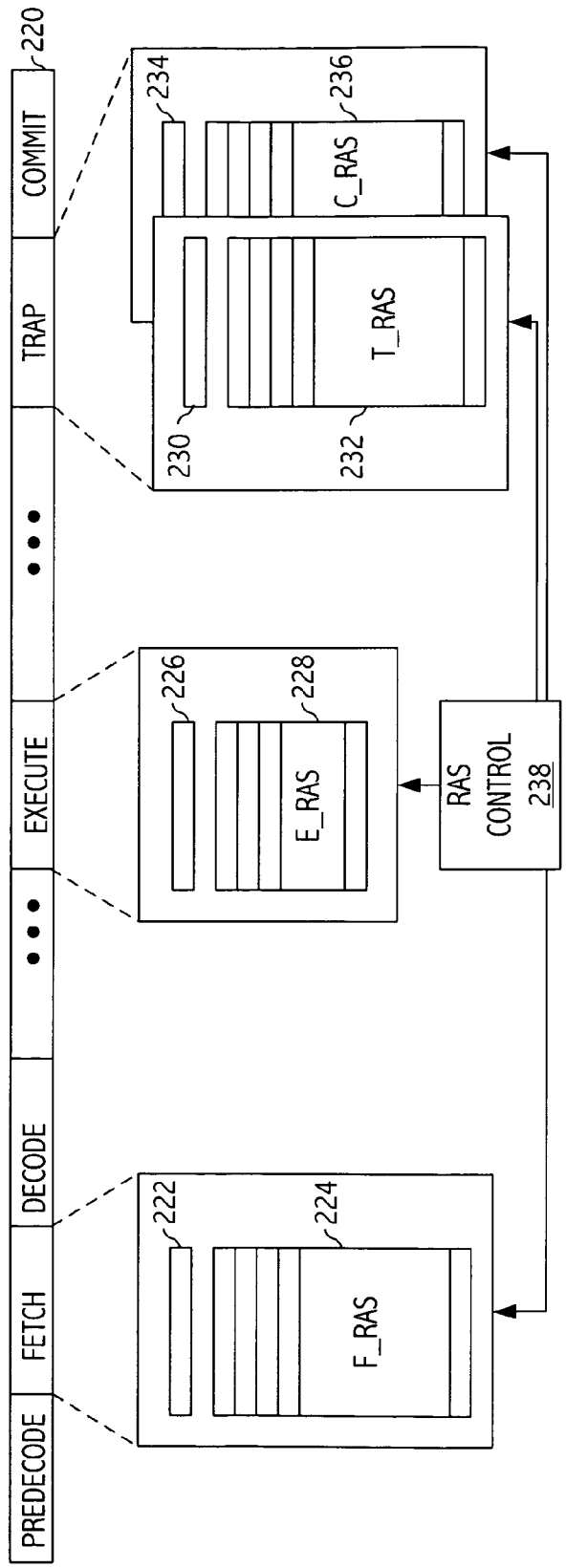
FIG. 2B illustrates a simplified processor pipeline and at least some associated hardware consistent with at least one embodiment of the invention.

Referring to FIG. 2B, in at least one embodiment of the present invention, stages of pipeline 220 are associated with corresponding return address stack pointers and return address stacks that are used to restore contents of both F_RAS 224 and F_RAS pointer 222. Return address stacks 232, 236, and 228 may be the same size as F_RAS 224 or may be smaller in size (e.g., differential RAS structures). F_RAS 224 and F_RAS pointer 222 are updated by RAS-affecting instructions during the fetch stage of pipeline 220. E_RAS 228 and E_RAS pointer 226 are updated during the execute stage and contain a time-delayed version of F_RAS 224 and F_RAS pointer 222. RAS control 238 restores the contents of F_RAS 224 and F_RAS pointer 222 with the contents of E_RAS 228 and E_RAS pointer 226 in the event that instructions fetched after a speculative instruction is resolved are being cleared from pipeline 220. T_RAS 232 and T_RAS pointer 230 are updated during the trap stage for RAS-affecting instructions that have executed without an exception event. RAS control 238 restores the contents of F_RAS 224 and F_RAS pointer 222 and E_RAS 228 and E_RAS pointer 226 with the contents of T_RAS 232 and T_RAS pointer 230 in the event of exception handling. C_RAS 236 and C_RAS pointer 234 are checkpointed versions of T_RAS 232 and T_RAS pointer 230. RAS control 238 restores the contents of F_RAS 224, E_RAS 228, and T_RAS 232 and associated pointers pointers 222, 226, and 230 with the contents of C_RAS 236 and C_RAS pointer 234, respectively, in the event that the program is restored to a checkpoint.

Other pipeline stages may have time delayed versions or other versions of the RAS pointer and/or the RAS associated with them. In addition, any or all of the RAS's associated with individual pipeline stages may be differential with respect to a RAS that is restored upon particular events. Other types of events may trigger restoration of the RAS pointer and/or RAS.

Figure 3A:
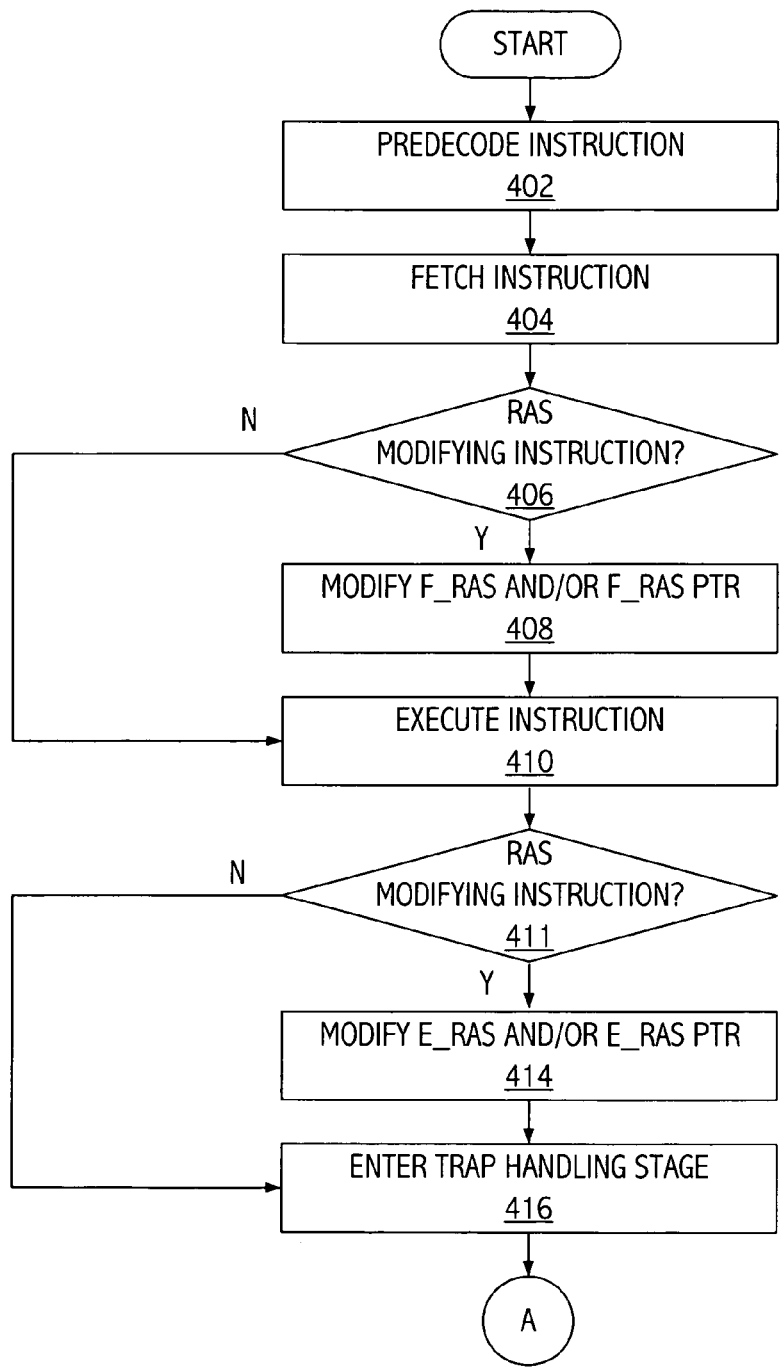
FIG. 3A illustrates information and control flows for modifying return address stacks and return address stack pointers consistent with at least one embodiment of the invention.
Figure 3B:
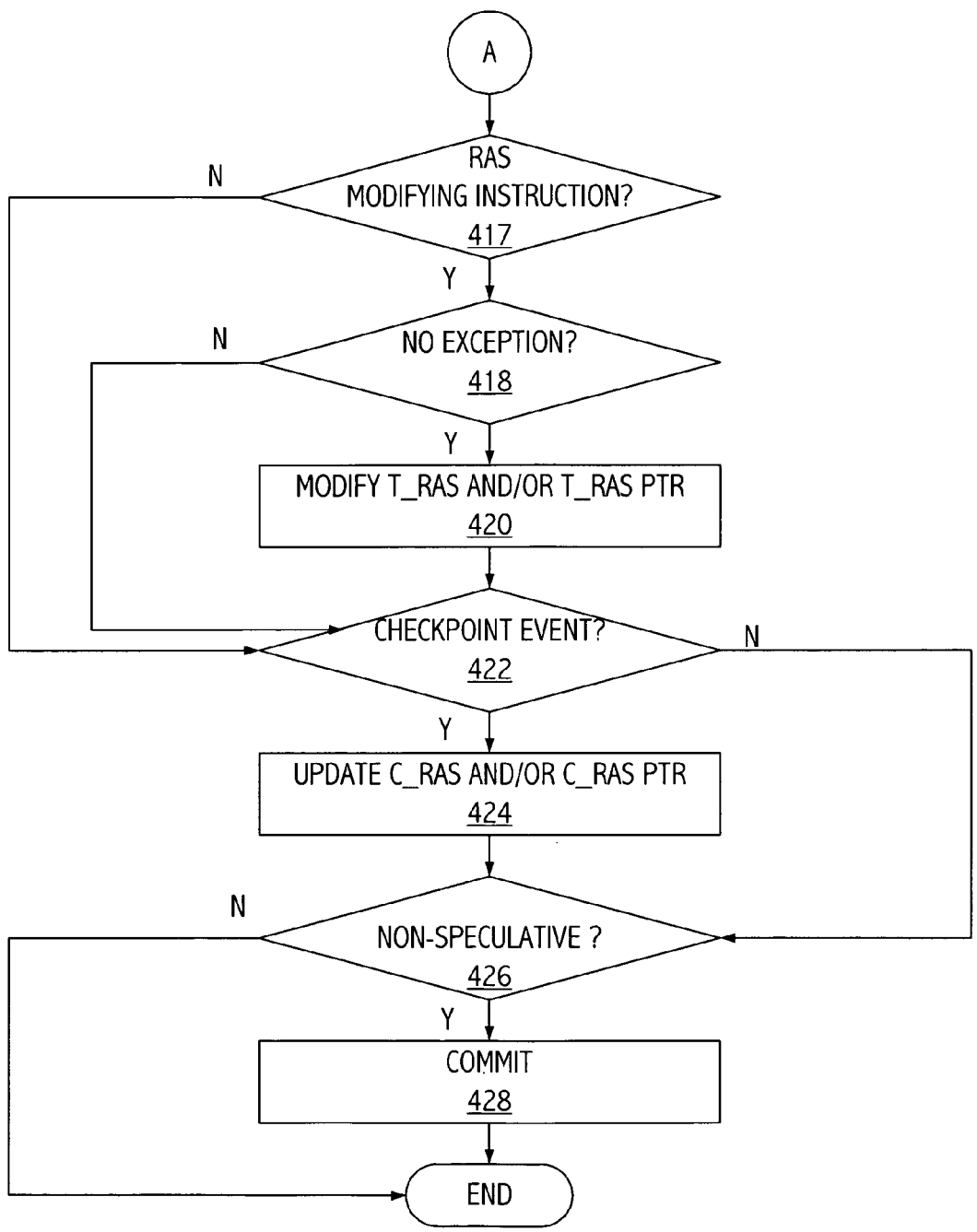
FIG. 3B illustrates information and control flows for modifying return address stacks and return address stack pointers consistent with at least one embodiment of the invention.

Referring to FIGS. 1, 3A, and 3B, a technique for recovering a return address stack upon a branch misprediction or detection of other operation that requires clearing the pipeline and returning the state of the pipeline to a previous state maintains at least one additional RAS and/or one additional RAS pointer for restoring a working RAS and/or RAS pointer. In at least one embodiment of the invention, predecode unit 126 decodes an instruction, which is stored in instruction store (e.g., an instruction cache) 118 (402). Fetch unit 120 fetches an instruction from instruction store 118 based on prediction information, when applicable, supplied by branch prediction unit 116 and writes the instruction in fetch buffers 128 (404). If the instruction is a RAS-modifying instruction (e.g., an instruction that performs a jump and link, a return, or other RAS-modifying instruction) (406), then fetch unit 120 performs a PUSH function or a POP function on F_RAS 134 and an associated F_RAS pointer is updated accordingly (408).

The instruction then proceeds through stages of pipeline 106, e.g., through decode unit 131, instruction queue 133 and issue unit(s) 135, or other combinations of pipeline stages, to a stage in which an instruction is issued to execution units 124. After entering the execution stage (410), execution unit 124 determines whether the instruction is a RAS-modifying instruction (411). If the instruction is a RAS-modifying instruction, the execution unit 124 updates E_RAS 130 and/or an E_RAS pointer accordingly (414). The instruction then proceeds through any additional pipeline stages to a trap handling stage (416).

Exemplary trap handler 122 determines whether the instruction is a RAS-modifying instruction (417) and whether the instruction has reached this stage in the pipeline without the occurrence of an exception event (418) and updates T_RAS 132 and/or an associated T_RAS pointer (420). In addition, if trap handler 122 determines that instruction currently being handled coincides with a checkpoint event (422), trap handler 122 copies T_RAS 132 and/or an associated T_RAS pointer to C_RAS 136 and/or an associated C_RAS pointer (424). Next, if the instruction is a non-speculative instruction (426) then the instruction is committed by commit unit 138 (428).

Figure 4:
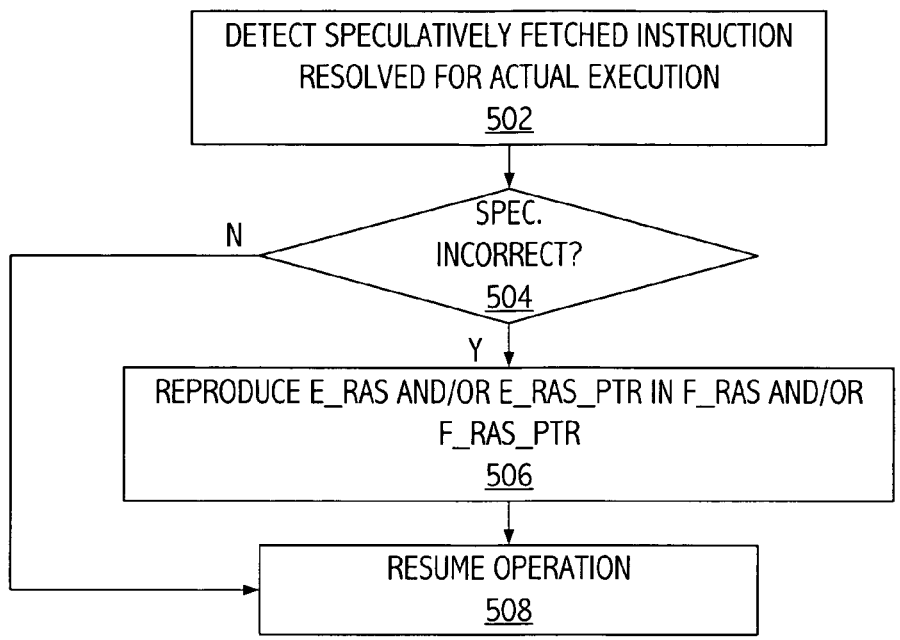
FIG. 4 illustrates information and control flows for recovery of a return address stack and/or an associated return address stack pointer upon actually executing an instruction that was previously fetched speculatively consistent with at least one embodiment of the invention.

An exemplary technique for restoring F_RAS 134 and/or an associated F_RAS pointer in response to actually executing an instruction that was previously fetched speculatively is illustrated in FIG. 4. The speculatively fetched instruction enters execution units 124 for actual execution (502). During this stage, RAS control 212 receives an indication of whether the instruction was correctly speculated (504). If the speculation was correct, F_RAS 134 and/or the associated F_RAS pointer contain correct information and are not updated. However, if the instruction was incorrectly speculated, RAS control initiates restoration of F_RAS 134 and/or the associated F_RAS pointer according to the contents of E_RAS 130 and/or the associated E_RAS pointer (506) and operations are resumed (508).

Figure 5:
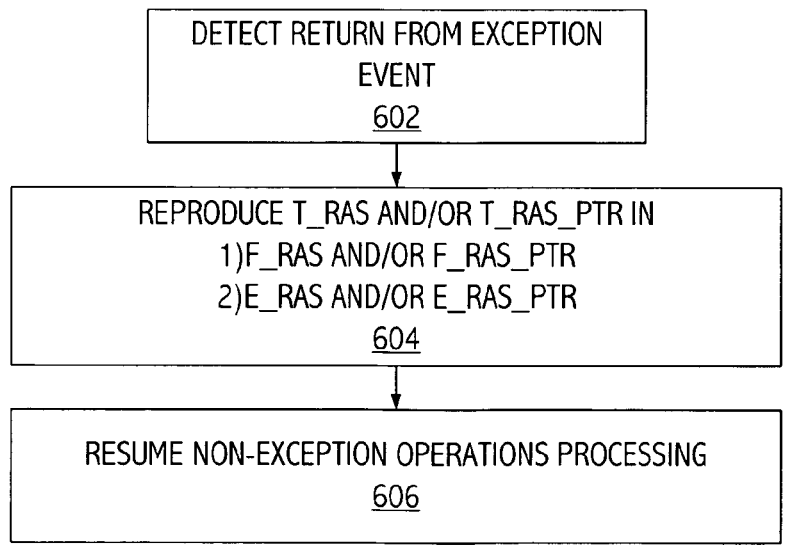
FIG. 5 illustrates information and control flows for recovery of a return address stack and return address stack pointer after exception processing consistent with at least one embodiment of the invention.

An exemplary technique for restoring E_RAS 130 and/or an associated pointer and/or F_RAS 134 and/or an associated F_RAS pointer in response to exception processing is illustrated in FIG. 5. When an exception event is detected by RAS control (602), prior to resuming normal operations, RAS control initiates restoration of E_RAS 130 and/or an associated pointer and/or F_RAS 134 and/or an associated F_RAS pointer according to the contents of T_RAS 132 and/or the associated T_RAS pointer (604). Then, non-exception operations are resumed (606).

Figure 6:
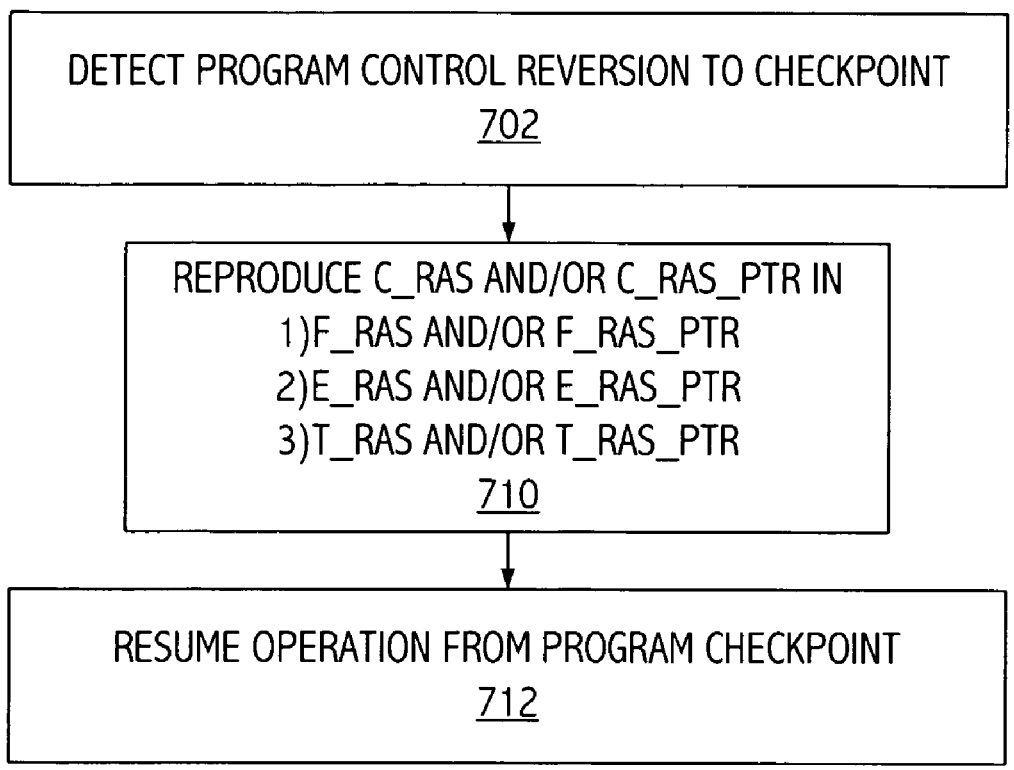
FIG. 6 illustrates information and control flows for recovery of return address stacks and return address stack pointers after mispredicted out-of-order execution consistent with at least one embodiment of the invention.

Referring to FIG. 6, an exemplary technique restores E_RAS 130 and/or an associated pointer and/or F_RAS 134 and/or an associated F_RAS pointer and/or T_RAS 132 and/or an associated T_RAS pointer in response to program control reverting to a program checkpoint. RAS control detects program control reversion to a predetermined checkpoint (702). Prior to resuming the program from a checkpointed instruction, RAS control initiates restoration of E_RAS 130 and/or an associated E_RAS pointer and/or F_RAS 134 and/or an associated F_RAS pointer and/or T_RAS 132 and/or an associated T_RAS pointer according to the contents of C_RAS 136 and/or the associated C_RAS pointer (710) and operations are resumed from the checkpoint (712).

Referring back to FIG. 1, control transfer instructions (CTIs) implemented by exemplary processor 100 include, e.g., any combination of conditional program counter (PC)-relative branches and calls, unconditional PC-relative branches and calls, conditional register-indirect jumps, unconditional register-indirect jumps, conditional traps, and unconditional traps. An exemplary instruction set includes the following types of CTIs: a conditional branch instruction type, an unconditional branch instruction type, a call and link (CALL) instruction type, a jump and link (JPML) instruction type, a return from trap (DONE, RETRY) instruction type, and a trap instruction type. In at least one embodiment of the invention, instructions accessed by processor 100 may be executed, annulled, or trapped. In general, in the absence of exception conditions, a particular instruction is executed unless a previous instruction annuls the instruction (e.g., the previous instruction is an annulling CTI or other annulling instruction) and the PC is updated accordingly. For example, if no exception event occurs, the PC receives a predetermined value (e.g., a value contained in a next PC (nPC) register), which may be the value of the PC increased by four or other suitable increment. However, if the instruction is a CTI, the predetermined value may be a target address for the CTI, which may be determined by other techniques.

In at least one embodiment of the invention, at least one CTI is a delayed control transfer instruction (DCTI), i.e., when only the value of the nPC is changed by the instruction, the effect of the transfer of control is delayed by one instruction. The instruction at a next sequential PC location following the DCTI is located in the delay slot of the DCTI. The instruction in the delay slot may be fetched prior to execution of the DCTI. A conditional or unconditional CTI may be a DCTI. The delay instruction may be fetched and/or executed or may be fetched and/or annulled according to a value of an annul field of the DCTI instruction. An annulled instruction has no effect on the program-visible state of processor 100 and cannot cause a trap.

In at least one embodiment of the invention, a DCTI causes the processor to change control to an instruction at a target address after a one instruction delay. A non-delayed CTI transfers control to the instruction at the target address immediately after the CTI is executed. Conditional delayed CTIs cause either a delayed or a non-delayed control transfer depending upon the value of an annul bit of the instruction in the delay slot and whether a condition is met. The instruction pointed to by the nPC when a DCTI is encountered is the delay instruction and, in general, is the next sequential instruction in the instruction space (i.e., PC+4). However, if the instruction that immediately precedes a DCTI is itself a DCTI, the address of the delay instruction is actually the target of the preceding DCTI. In general, pipeline front-end complexity increases for the hardware to ensure proper instruction execution when a DCTI is positioned as a last instruction of a cache line and to ensure proper instruction execution of consecutive DCTIs.

Exemplary processor 100 is responsive to a call-type instruction (e.g., CALL) that causes an unconditional, delayed, PC-relative control transfer to a program address, e.g., address PC+(4*sign_ext(disp30)), where disp30 is a 30-bit displacement field. However, the destination program address may be computed by other suitable techniques. In at least one embodiment of the invention, processor 100 is responsive to other call-type instructions included in the instruction set, e.g., a register-indirect call-type instruction. For example, processor 100 performs a register-indirect call in response to a JMPL instruction that uses a link register as the destination register (e.g., rd=15). Other instruction set designs may implement call-type instructions using other techniques. In addition, rather than a dedicated CALL type instruction, processor 100 may respond to branch-type and/or jump-type instructions using pc-relative, register-indirect, register-direct, absolute, or other suitable addressing techniques for computing a target program address.

In response to an exemplary call-type instruction, processor 100 writes the value of the PC, which contains the address of the call-type instruction, into a link register (e.g., r[15], which is a particular out register of a register window associated with architected register file 142 and working register file 140). In addition, processor 100 pushes the value of the PC onto the RAS (e.g., F_RAS 134) for use in prediction of a return address from a subroutine invoked by the call-type instruction.

An exemplary return-type instruction is a CTI that causes a transfer of control to a target program address, typically to an instruction sequence that transferred control to an instruction sequence including the return-type instruction. In at least one embodiment of the invention, a return-type instruction (e.g., RETURN) also restores the register window prior to a last instruction (e.g., the register window prior to a SAVE instruction) that provided a new register window to the instruction sequence. The target address of a return-type instruction may be an immediate address, a register indirect address, a PC-relative address, or an address computed by other suitable techniques. Exemplary processor 100 computes a target address of a RETURN instruction based on the contents of two registers or on the contents of one register and an immediate value. In at least one embodiment of the invention, processor 100 is responsive to other return-type instructions included in the instruction set, e.g., a register-indirect return-type instruction. For example, processor 100 performs a register-indirect return in response to a JMPL instruction that uses a link register as the destination register (e.g., rd=0). Other instruction set designs may implement return-type instructions using other techniques. For example, rather than a dedicated RETURN type instruction, branch-type and/or jump-type instructions using pc-relative, register-indirect, register-direct, absolute, or other suitable addressing techniques for computing a target program address may be used.

Figure 7A:
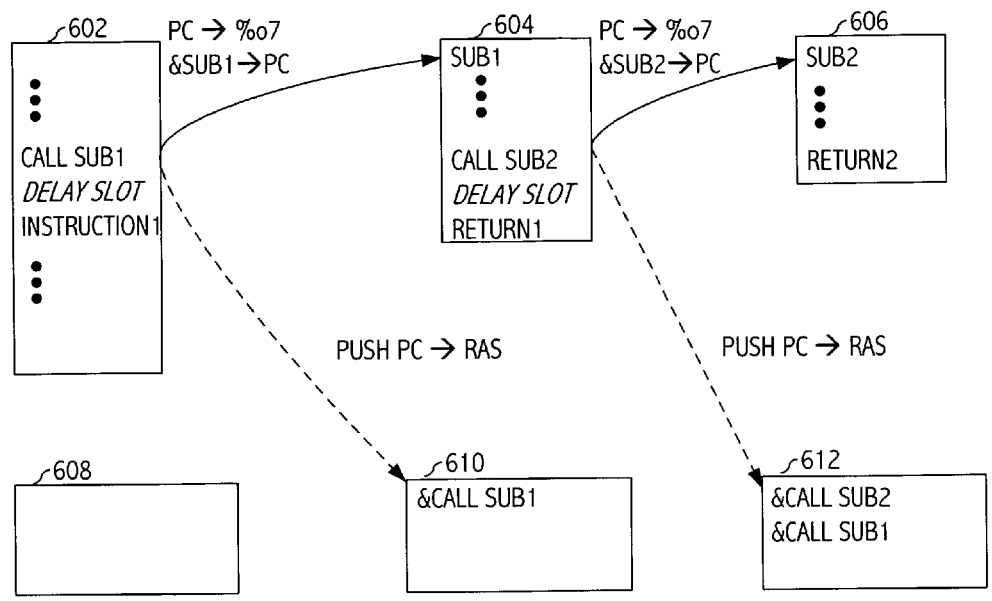
FIGS. 7A and 7B illustrate exemplary instruction sequences and corresponding return address stack content consistent with at least one embodiment of the invention.

Referring to FIG. 7A, exemplary instruction sequence 602 is a main program, subroutine, function, or other sequence of instructions that calls a first subroutine, e.g., SUB1. The CALL SUB1 instruction of instruction sequence 602 is a DCTI instruction. Exemplary instruction sequence 602 does not include a tail-call sequence of instructions indicative of an associated elimination of a return-type instruction (hereinafter, a tail-call elimination instruction sequence or tail-call elimination sequence). The delay slot following CALL SUB1 of instruction sequence 602 includes any suitable instruction, accordingly.

When processor 100 executes CALL SUB1 of instruction sequence 602, processor 100 stores the current PC in a particular register (e.g., o7 of a register window associated with architected register file 142 and working register file 140). In addition, the instruction in the delay slot is fetched and executed, the current PC or other return address information is pushed onto the RAS (e.g., F_RAS 134 is updated from RAS state 608 to RAS state 610), the PC is updated to receive the value of the location corresponding to SUB1, and program control is transferred to subroutine 604. Subroutine 604 includes an instruction sequence that calls a second subroutine (e.g., by CALL SUB2) as a last instruction of the subroutine prior to a return-type instruction (e.g., RETURN1), which returns program control from subroutine 604 to instruction sequence 602. When processor 100 executes CALL SUB2 of subroutine 604, processor 100 stores the current PC in the particular register (e.g., o7). In addition, the instruction in the delay slot is executed, the current PC is pushed onto the RAS (e.g., F_RAS 134 is updated from RAS state 610 to RAS state 612), the PC is updated to the value of the location corresponding to the CALL SUB2 instruction, and program control is transferred to subroutine 606.

Figure 7B:
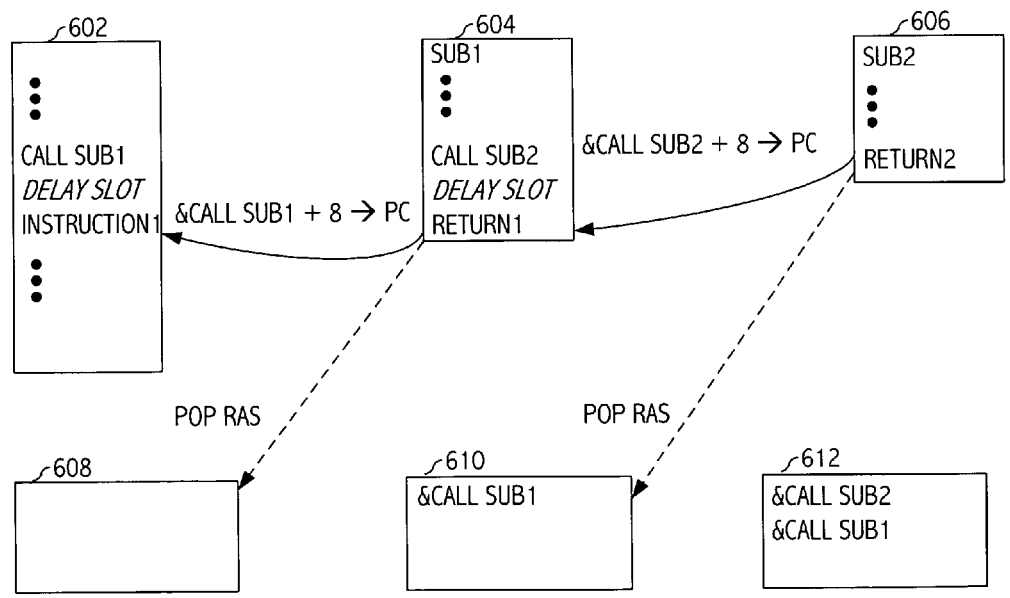

Referring to FIG. 7B, when subroutine 606 completes and a return-type instruction is executed (e.g., RETURN2), program control is transferred back to subroutine 604. The PC may be speculatively updated to receive a predicted return-address value that is an incremented version of an address stored on the RAS and pops the RAS. For example, the PC may receive an incremented version of the address of the CALL SUB2 instruction, the PC is updated to point to RETURN1, the next instruction to be executed in subroutine 604, and processor 100 pops the RAS (e.g., F_RAS 134 is returned from RAS state 612 to RAS state 610). Upon receiving program control, subroutine 604 executes the last instruction in the subroutine, e.g., RETURN1. Program control is then transferred back to instruction sequence 602. For example, the PC is speculatively updated to receive an address that is the address of the CALL SUB1 instruction incremented by eight (e.g., the PC is updated to point to INSTRUCTION1, the next instruction to be executed in instruction sequence 602) and processor 100 pops the RAS (e.g., updating F_RAS 134 from RAS state 610 to RAS state 608). Note that the control sequence illustrated in FIG. 7B executes two consecutive DCTI instructions (e.g., RETURN2 immediately followed by RETURN1). Such a sequence may introduce substantial processing penalties due to program control transfers (e.g., penalties associated with loading target instructions into instruction store 118 and penalties due to mispredicted target addresses).

One technique for reducing penalties introduced by transfers in program control eliminates execution of one of the two return-type instructions. With such a technique, one return-type instruction would effectively return program control for two return-type instructions (e.g., eliminates the execution RETURN1 of subroutine 604). The technique may eliminate a return-type instruction that may otherwise immediately follow the call-type CTI at the tail of an instruction sequence (hereinafter, a tail-call). In at least one embodiment of the invention, a compiler suitable for converting high-level code (e.g., code written in C++ or other high-level language) into machine code consistent with processor 100 performs the technique eliminating the return-type instruction associated with a tail-call instruction. However, such return-type instruction may be included, but is not executed because a return address of a subroutine called by the tail-call returns the program to an instruction sequence that calls the subroutine including the tail-call instruction.

An exemplary tail-call elimination technique reduces a number of machine code instructions included in the compiled code, which for some instruction sequences reduces the number of instructions executed and improves performance of the processor for such operating sequences. The exemplary compiler implementing a tail-call elimination technique detects subprograms (e.g., subroutines, procedures, functions, or other sequences of code that include return-type CTIs to exit such sequences of instructions and return to a sequence of instructions that called the subroutine, procedure, functions or other sequences of instructions). The exemplary compiler detects a first subprogram including a last instruction (i.e., a last instruction before a return-type CTI) that is a call to a second subprogram. Rather than including two return-type CTIs as last instructions in corresponding ones of the two subprograms, the compiler eliminates the return-type CTI as the last instruction of the first subprogram and includes only one return-type CTI for the two subprograms. In at least one embodiment of the invention, the one return-type CTI is the last instruction of the second subprogram and returns from the second subprogram to the program that called the first subprogram. This technique allows a first function whose last instruction is a second function call to eliminate the overhead of two return transfers of program control. The compiler includes a single return-type instruction having the return address that would be used by the first subprogram in the return from the second subprogram. However, this optimization technique results in an instruction flow that includes two call-type instructions, but only one return-type instruction. Such an instruction flow corrupts the RAS, which may result in return address mispredictions and substantial performance degradation.

For example, during execution, processor 100 fetches and executes two subprogram call-type instructions, but fetches and executes only one return-type instruction. In general, processor 100 is an architecture that pushes the PC associated with the instruction performing the subprogram call onto the RAS for use in predicting the return address of called subprogram. Although a PC associated with a call-type instruction is pushed onto the RAS for each of the two subprogram calls, in situations where the compiler eliminates a return-type instruction associated with a tail-call of a subroutine, the RAS is popped only once and the RAS content and/or alignment is corrupted, which may result in return address mispredictions.

In at least one embodiment of the invention, to reduce return address mispredictions, processor 100 (e.g., RAS control 212 of FIG. 2A or RAS control 238 of FIG. 2B) pushes the RAS upon executing call-type instructions unless processor 100 detects a tail-call elimination instruction sequence. Exemplary instruction sequences indicative of a tail-call elimination (i.e., a tail-call elimination sequence of one or more instructions) include a call-type DCTI and a particular instruction in the delay slot of the DCTI. The particular instruction may be any suitable instruction that indicates a tail-call elimination.

In at least one embodiment of the invention, the particular instruction detected may be one of a plurality of instructions that effectively restore a saved version of the PC to a version prior to the call-type DCTI. An exemplary tail-call elimination sequence of instructions includes a CALL instruction with a MOV % x, % o7 in the delay slot of the CALL. The MOV % x, % o7 overwrites a version of the PC that was saved in register o7 of processor 100 by the CALL instruction and replaces that version with a version of the PC saved temporarily to a register (e.g., the x register) by a MOV % o7, % x instruction prior to the DCTI. Although the MOV % o7, % x instruction may be located immediately prior to the call-type instruction, it is not necessarily so located and may be located in any position prior to the DCTI that maintains the integrity of the contents of the x register until the delay slot of the tail call-type instruction.

Another exemplary tail-call elimination sequence of instructions includes a tail CALL instruction with a RESTORE instruction in the delay slot of the CALL instruction. The RESTORE instruction restores contents of a register that stores a version of the PC used as a return address of a call and which were saved by a SAVE instruction to a temporary location prior to the CALL instruction. The RESTORE instruction restores to the register that stores the return address for a RETURN instruction the previously saved version of the PC used as the return address.

Referring to FIGS. 8A, 8B, 9A, and 9B, exemplary instruction sequences and associated RAS states are illustrated for exemplary instruction sequences including tail-call elimination of return-type instructions. Instruction sequence 702 is a main program, subroutine, function, or other sequence of instructions that calls a first subroutine, e.g., SUB1. A CALL SUB1 instruction of instruction sequence 702 is a DCTI instruction having a delay slot. Exemplary instruction sequence 702 does not include a tail-call elimination sequence of instructions and the delay slot following CALL SUB1 of instruction sequence 702 includes any suitable instruction, accordingly. However, instruction sequence 702 may include a tail-call elimination instruction sequence and the instruction sequences and corresponding RAS states of FIGS. 8A and 8B may be adapted accordingly.

When processor 100 executes CALL SUB1 of instruction sequence 702, processor 100 stores the current PC in a particular register (e.g., o7). In addition, the instruction in the delay slot is executed, the current PC or other return address information is pushed onto the RAS (e.g., F_RAS 134 is updated from RAS state 708 to RAS state 710), the PC is updated to receive the destination address of the CALL SUB1 instruction, and program control is transferred to subroutine 704. Subroutine 704 includes a tail-call elimination sequence of instructions and does not include a return-type instruction, although such an instruction may be included, but not executed in some embodiments of the invention. Processor 100 detects a call-type DCTI and a particular instruction in the delay slot of the DCTI (e.g., processor 100 detects CALL SUB2 and with MOV % x, % o7 in the delay slot of CALL SUB2).

Figure 8A:
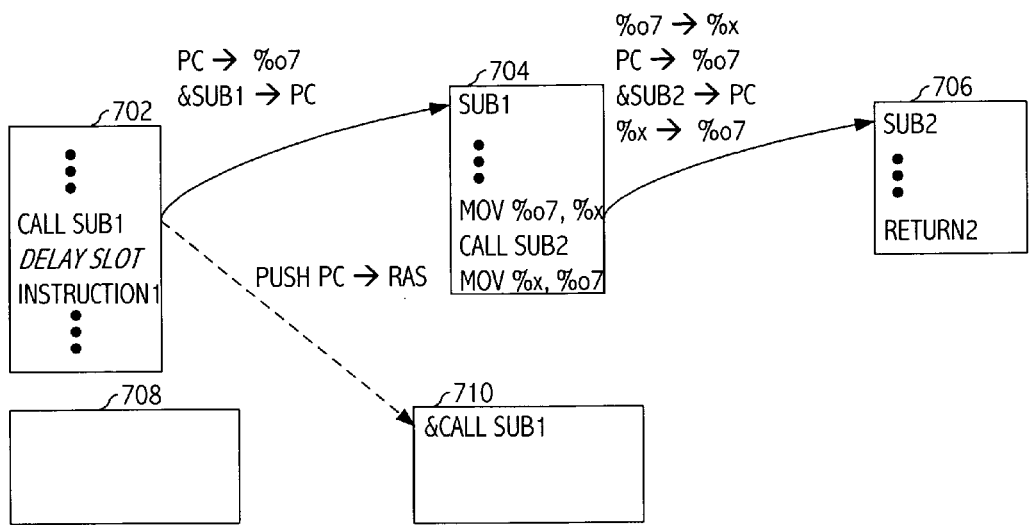
FIGS. 8A and 8B illustrate exemplary instruction sequences and corresponding return address stack content for tracking of return addresses after tail call-type instruction elimination of a return-type instruction consistent with at least one embodiment of the invention.
Figure 8B:
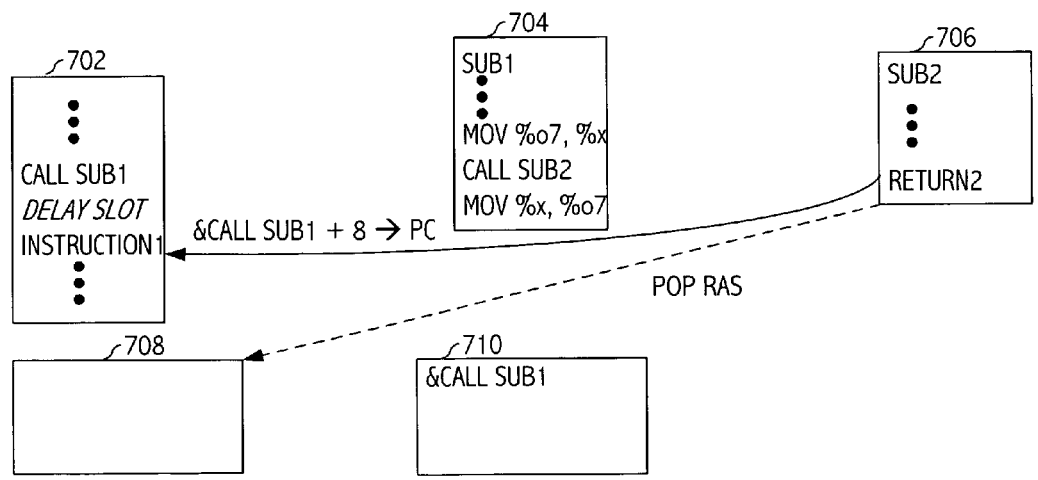
Figure 9A:
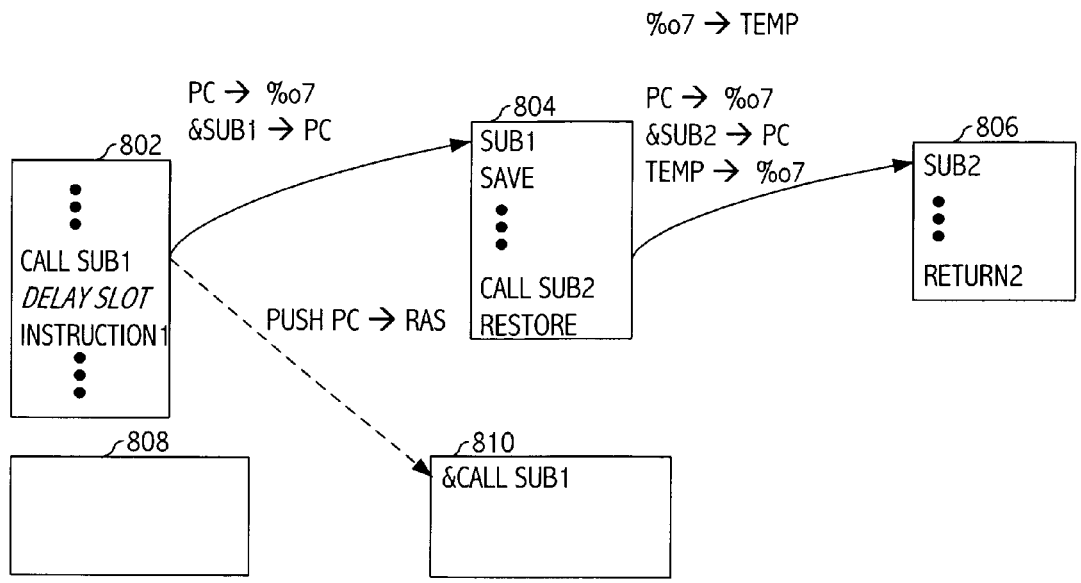
FIGS. 9A and 9B illustrate exemplary instruction sequences and corresponding return address stack content for tracking of return addresses after tail call-type instruction elimination of a return-type instruction consistent with at least one embodiment of the invention.
Figure 9B:
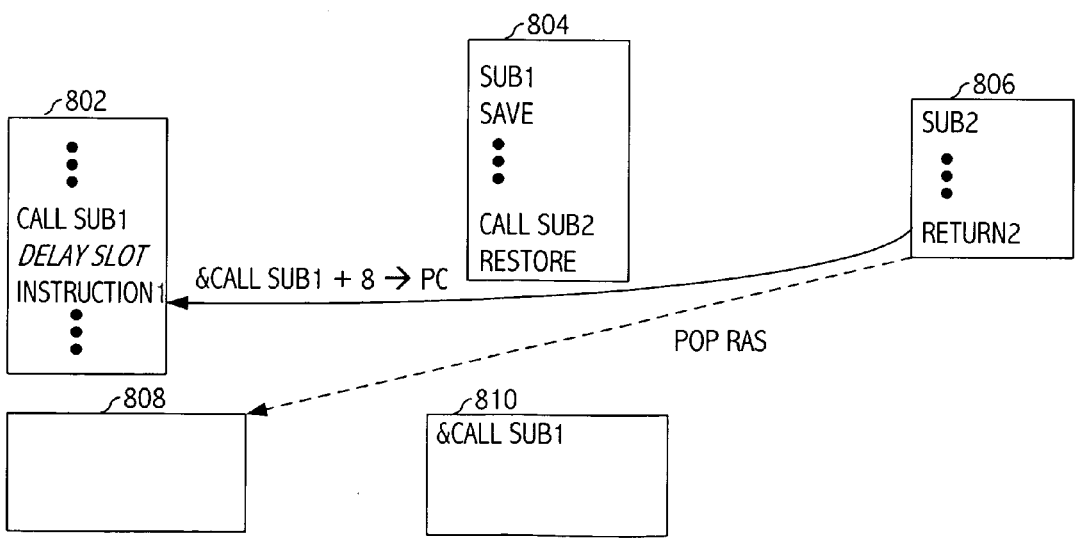

Since processor 100 detects the tail-call elimination instruction sequence of subroutine 704, processor 100 does not push the RAS upon execution of the CALL SUB2 instruction of subroutine 704. Accordingly, the state of the RAS (e.g., RAS state 710) does not change as a result of executing CALL SUB2 although program control changes from subroutine 704 to subroutine 706. Referring to FIG. 8B, subroutine 706 completes with a return-type instruction (e.g., RETURN2). Program control does not return to subroutine 704, the subroutine that called subroutine 706, in response to the RETURN2 instruction. Rather, processor 100 transfers program control back to instruction sequence 702 (e.g., to INSTRUCTION1) and processor 100 (e.g., in response to the RETURN2 instruction) pops the RAS returning F_RAS 134 to RAS state 708 from RAS state 710. The call-type instructions executed by instruction sequence 702 and subroutine 704 generate only one push of the RAS and one corresponding pop of the RAS. Thus, processor 100 maintains RAS alignment and content while improving cycle-time of some instruction sequences associated with tail-call elimination of return-type instructions.

In at least one embodiment of the invention, the particular instruction detected in the delay slot of a call-type DCTI is a restore-type instruction (e.g., RESTORE instruction of subroutine 804 of FIG. 9A) that effectively restores a saved version of the PC to a version prior to the call-type DCTI (e.g., saved by the SAVE instruction in subroutine 804). Since processor 100 detects the tail-call elimination instruction sequence of subroutine 804, processor 100 does not push the RAS upon execution of the CALL SUB2 instruction of subroutine 804. Accordingly, the state of the RAS (e.g., RAS state 810) does not change as a result of executing CALL SUB2 although program control changes from subroutine 804 to subroutine 806. The SAVE instruction of subroutine 804 saves a version of register o7 to a temporary location, thus saving the return address of subroutine 804 (e.g., saving the address of the CALL SUB1 instruction of instruction sequence 802).

The CALL SUB2 instruction of subroutine 804 saves a copy of the PC to register o7 (e.g., saves the address of CALL SUB2 to register o7) and updates the PC to change program control to subroutine 806 (e.g., PC is loaded with the address of SUB2). The restore-type instruction in the delay slot of the CALL SUB2 instruction copies the value in the temporary register back into register o7. Upon returning from subroutine 806, an indicator of the actual return address is located in register o7. The indicator is incremented and loaded into the PC, and control transfers from subroutine 806 to instruction sequence 802. Processor 100 pops the RAS and the state of the RAS changes from RAS state 810 to RAS state 808. Thus, processor 100 maintains RAS alignment and content while improving cycle-time of some instruction sequences associated with tail-call elimination of return-type instructions.

Referring back to FIG. 1 the last instruction in instruction store 118 may be a call-type DCTI. In at least one embodiment of the invention, shared logic 112 may include control logic to stall issue and/or execution of the call-type DCTI until the instruction in the delay slot is loaded into instruction store 118 to allow proper decode of the tail-call elimination sequence and eliminate a push of the RAS associated with the call-type DCTI. However, shared logic 112 may issue and/or execute the call-type DCTI without issuing and/or executing the instruction in the associated delay slot. Such an implementation may push the RAS twice, but pop the RAS once for a tail-call instruction sequence. Misalignment of the RAS may result in return address mispredictions and associated degradation in performance. The approach taken by shared logic 112 in such a situation includes a design tradeoff between circuit complexity and decreased performance due to return address mispredictions. However, a call-type instruction positioned as the last instruction in instruction store 118 may be sufficiently infrequent that a resulting misalignment of the RAS has an insubstantial impact on performance. In addition, software designers and compilers may prepare code for processor 100 with the knowledge that positioning a call-type instruction as the last instruction in instruction store 118 is undesirable, and may align instructions to reduce or eliminate such occurrences.

In at least one embodiment of the invention, processor 100 includes a predecode unit (e.g., predecode unit 126) that detects tail-call elimination instruction sequences when a cache line is installed in instruction store 118. An individual instruction is augmented by the predecode unit to include at least one predecode bit corresponding to information on whether to push or pop the RAS. Accordingly, processor 100 may push or pop a RAS according to the predecode bit(s) without substantially impacting cycle time of fetch unit 120.

Figure 10:
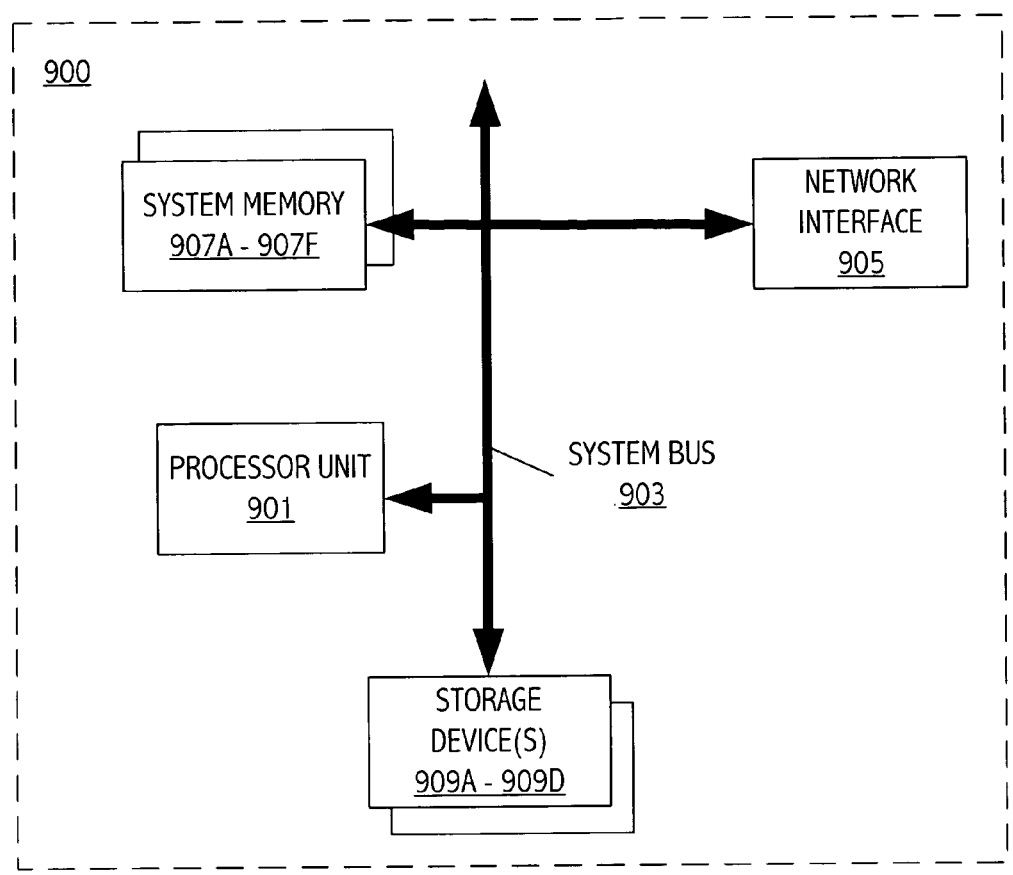
FIG. 10 illustrates block diagram of an exemplary computer system consistent with at least one embodiment of the invention.

Referring to FIG. 10, an exemplary computer system (e.g., computer system 900) includes a processor unit 901 (possibly including multiple processors, a single threaded processor, a multi-threaded processor, a multi-core processor, etc.). The computer system 900 also includes a system memory 907A-907F (e.g., one or more of cache, SRAM DRAM, RDRAM, EDO RAM, DDR RAM, EEPROM, or other suitable memory), a system bus 903 (e.g., LDT, PCI, ISA, or other suitable interface), a network interface 905 (e.g., an ATM interface, an Ethernet interface, a Frame Relay interface, or other suitable interface), and a storage device(s) 909A-909D (e.g., optical storage, magnetic storage, or other suitable storage device). At least one embodiment of the invention includes fewer or additional components not illustrated in FIG. 10 (e.g., video cards, audio cards, additional network interfaces, peripheral devices, or other components). Processor unit 901, storage device(s) 909A-909D, network interface 905, and system memory 907A-907F are coupled to system bus 903. Processor unit 901 includes a return address stack and return address stack recovery system consistent with the present invention.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium and a network, wireline, wireless or other communications medium.

The description of the invention set forth herein is illustrative, and is not intended to limit the scope of the invention as set forth in the following claims. For example, while the invention has been described in an embodiment in which a particular pipeline architecture is described, one of skill in the art will appreciate that the teachings herein can be utilized with other pipeline architectures. Variations and modifications of the embodiments disclosed herein, may be made based on the description set forth herein, without departing from the scope and spirit of the invention as set forth in the following claims.

What is claimed is:

1. An apparatus comprising:
a speculative execution processor pipeline;
a first structure for maintaining return addresses relative to instruction flow at a first stage of the pipeline;
a second structure for maintaining return addresses relative to instruction flow at a second stage of the pipeline which is deeper in the pipeline than the first stage;
a third structure for maintaining return addresses relative to instruction flow at a third stage of the pipeline, wherein said third stage is deeper in the pipeline than the second stage; and
circuitry, coupled to said first, second, and third structures,
(1) to use return addresses in said second structure to restore return addresses in said first structure upon occurrence of at least a first event; and
(2) to use return addresses in said third structure to restore return addresses in said first and second structures upon occurrence of at least a second event, wherein said second event is different from said first event, wherein:
the second structure is configured to update when a structure-affecting instruction progressing through the pipeline is known to be non-speculatively executed; and
the third structure is configured to update after a structure-affecting instruction reaches a point in execution in which all previous instructions relative to the structure-affecting instruction have executed without a particular event occurring.

2. The apparatus, as recited in claim 1, wherein the first and second structures are respective ones of first and second return-address-stacks (RASs) referenced by respective ones of a first stack pointer and a second stack pointer.

3. The apparatus, as recited in claim 1, wherein the first structure is associated with a fetch portion of the pipeline and wherein the return addresses stored therein reflect predicted executed instruction flow.

4. The apparatus, as recited in claim 3, wherein the second structure is associated with an execution portion of the pipeline and wherein the return addresses stored therein reflect executed instruction flow.

5. The apparatus, as recited in claim 4, wherein the second structure is configured to update when a structure-affecting instruction is known to be executed rather than merely predicted to be executed.

6. The apparatus, as recited in claim 1, wherein the third structure is configured to update after a structure-affecting instruction reaches a point in execution in which all previous instructions relative to the structure-affecting instruction have executed without a particular event occurring.

7. The apparatus, as recited in claim 1, further comprising:
an additional structure coupled to said circuitry, and configured to save return address information for a checkpoint, wherein said circuitry uses return addresses in said additional structure to restore return addresses in the first, second, and third structures upon restarting the processor at the checkpoint.

8. The apparatus, as recited in claim 1, embodied as one or more media encoding a design file representation of the apparatus.

9. A method of operating a processor, the method comprising:
maintaining a respective return address structure corresponding to respective instruction flow at each of at least three different stages within a pipeline of the processor, wherein a first return address structure is for a first stage of said at least three different stages;
a second return address structure is for a second stage of said at least three different stages; and
a third return address structure is for a third stage of said at least three different stages, and further wherein
said second stage is deeper in said pipeline than said first stage; and
said third stage is deeper in said pipeline than said second stage;
restoring return address information from said second return address structure to said first return address structure upon occurrence of at least a first event;
restoring return address information from said third return address structure to said first and second return address structures upon occurrence of at least a second event, wherein said second event is different from said first event;
updating the second return address structure when a structure-affecting instruction progressing through the pipeline is known to be non-speculatively executed; and
updating the third return address structure after a structure-affecting instruction reaches a point in execution in which all previous instructions relative to the structure-affecting instruction have executed without a particular event occurring.

10. The method as recited in claim 9 wherein the restoring return address information from said second return address structure to said first return address structure comprises:
copying information from said second return address structure into said first return address structure.

11. The method as recited in claim 9, further comprising:
updating at least one of the first, second, and third return address structures upon restarting the pipeline at a checkpoint.

* * * * *